J. A. ZOEBL.
Sled-Propeller.

No. 204,937. Patented June 18, 1878.

WITNESSES:
O. R. Erwin
G. H. Schattenberg.

INVENTOR:
Johan A. Zoebl
By Jas. B. Erwin
Atty

UNITED STATES PATENT OFFICE.

JOHAN A. ZOEBL, OF MILWAUKEE, WISCONSIN.

IMPROVEMENT IN SLED-PROPELLERS.

Specification forming part of Letters Patent No. 204,937, dated June 18, 1878; application filed September 15, 1877.

*To all whom it may concern:*

Be it known that I, JOHAN A. ZOEBL, of the city of Milwaukee, in the county of Milwaukee and State of Wisconsin, have invented certain new and useful Improvements in Sled-Propellers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
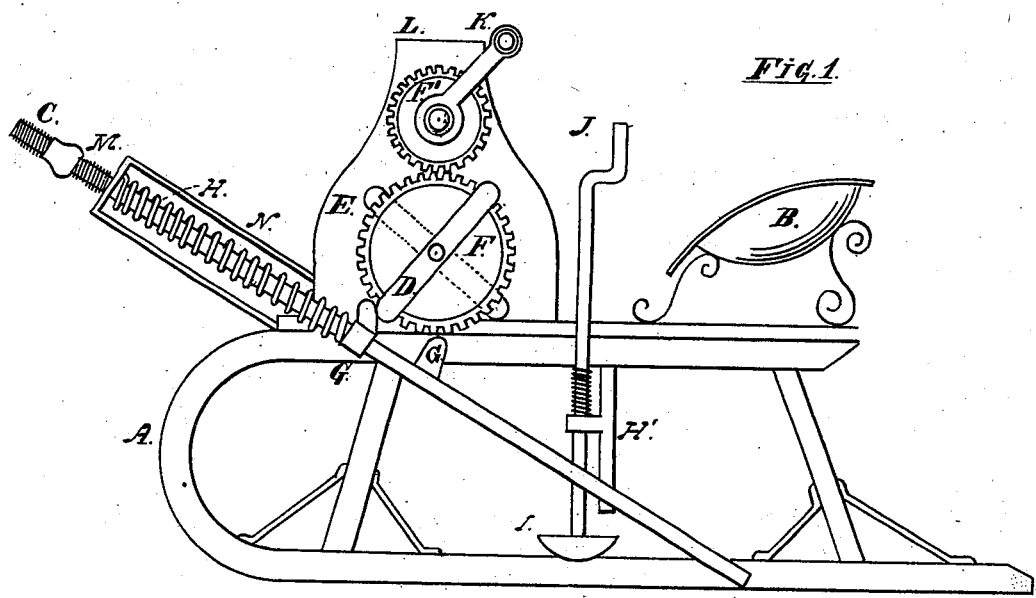
Figure 2:
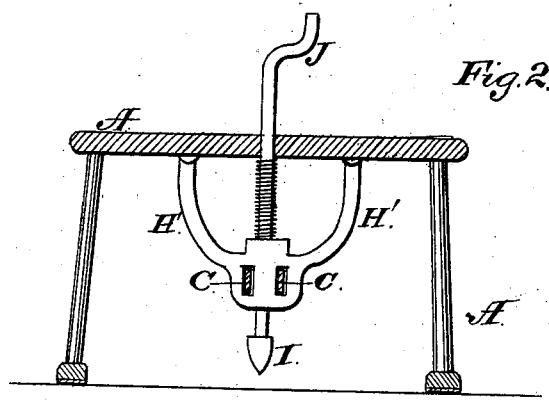

Figure 1 is a sectional side elevation of my invention, and Fig. 2 an end view, partly in section, showing bracket device.

The object of my invention is to furnish a device for propelling sleds and other vehicles to be operated by the person riding thereon, all of which is further explained by reference to the accompanying drawings, of which—

A represents the sled. B is a seat attached to the same, by which the person is elevated in a convenient position for operating the propelling apparatus. C C are the propelling-rods, which operate alternately forward and backward. As the rods C C move backward they strike against the track, and thus propel the sled forward. The rods C C are drawn forward by the arms D and E, which are attached to the wheel F, the rods C C being provided with catches G G, against which the ends of the levers D and E strike as they revolve and carry the rods C C forward until the levers D and E become disengaged from the catches, when the rods C are caused to fly back by the spiral springs H, which surround them.

H' is a bracket which serves to hold tl e rods C in proper position, and also serves to support the guiding device I, which extends above the sled, and is provided with a handle, J, by which it is turned to direct the course of the sled.

K represents the handles by which the propeller is operated. L is a case to the gearing, which also serves to support the gear-wheels F and F'. The rods C C are each provided with adjusting-screws M, by which the length of their stroke is regulated, and the tension of the spiral springs H is increased or diminished. N is a case for protecting and supporting the upper ends of the rods C C.

Having thus described my invention, what I claim as new, and desire to secure by Letters Patent, is—

1. In a device for propelling sleds and other vehicles, the combination of the gear-wheels F and F', provided with handles K and levers D and E, with the propelling-rods C C and sled A, substantially as specified.

2. The rods C C, provided with spiral springs H and adjusting-screws M, substantially as and for the purpose specified.

In testimony that I claim the foregoing as my own I affix my signature in presence of two witnesses.

JOHAN A. ZOEBL.

Witnesses:
J. V. V. PLATTO,
J. B. ERWIN.